(12) United States Patent
Patel

(10) Patent No.: US 8,122,247 B2
(45) Date of Patent: Feb. 21, 2012

(54) PROCESSING METHOD FOR MESSAGE INTEGRITY WITH TOLERANCE FOR NON-SEQUENTIAL ARRIVAL OF MESSAGE DATA

(75) Inventor: Sarvar Patel, Montville, NJ (US)

(73) Assignee: Alcatel Lucent, Paris (FR)

( * ) Notice: Subject to any disclaimer, the term of this patent is extended or adjusted under 35 U.S.C. 154(b) by 999 days.

(21) Appl. No.: 11/976,126

(22) Filed: Oct. 22, 2007

(65) Prior Publication Data

US 2008/0165953 A1 Jul. 10, 2008

Related U.S. Application Data

(60) Provisional application No. 60/853,646, filed on Oct. 23, 2006, provisional application No. 60/860,330, filed on Nov. 21, 2006.

(51) Int. Cl.
*H04L 29/06* (2006.01)
(52) U.S. Cl. ......... 713/161; 713/181
(58) Field of Classification Search ......... None
See application file for complete search history.

(56) References Cited

U.S. PATENT DOCUMENTS

| | | | |
|---|---|---|---|
| 5,608,801 A | 3/1997 | Aiello et al. | |
| 5,757,913 A * | 5/1998 | Bellare et al. | 713/168 |
| 6,028,933 A | 2/2000 | Heer et al. | |
| 6,415,032 B1 * | 7/2002 | Doland | 380/255 |
| 6,920,504 B2 * | 7/2005 | Bender et al. | 709/232 |
| 7,054,445 B2 * | 5/2006 | Gligor et al. | 380/37 |
| 2002/0122554 A1 * | 9/2002 | Lilly | 380/28 |
| 2002/0159588 A1 * | 10/2002 | Kauffman et al. | 380/28 |
| 2005/0193197 A1 | 9/2005 | Patel et al. | |
| 2006/0210065 A1 * | 9/2006 | Ito et al. | 380/28 |

FOREIGN PATENT DOCUMENTS

| | | |
|---|---|---|
| AU | 2005201982 | 6/2005 |
| CN | 1194744 | 9/1998 |

OTHER PUBLICATIONS

International Search Report and Written Opinion dated Nov. 3, 2008.
Chinese Office Action and English translation dated Apr. 26, 2011.

* cited by examiner

*Primary Examiner* — Gilberto Barron, Jr.
*Assistant Examiner* — David Le
(74) *Attorney, Agent, or Firm* — Harness, Dickey & Pierce, P.L.C.

(57) ABSTRACT

One example embodiment of the present invention discloses a method for processing an application packet for transmission, includes breaking the application packet into a plurality of segments, creating first pseudorandom bits, and generating partial tags based on each of the plurality of segments and portions of the first pseudorandom bits associated with each of the plurality of segments. The method further including combining the partial tags including a last partial tag associated with a last segment of the application packet to create an accumulated tag, generating an authentication tag based on the accumulated tag and second pseudorandom bits, storing the authentication tag, and transmitting the plurality of segments including the authentication tag.

23 Claims, 8 Drawing Sheets

Encryption

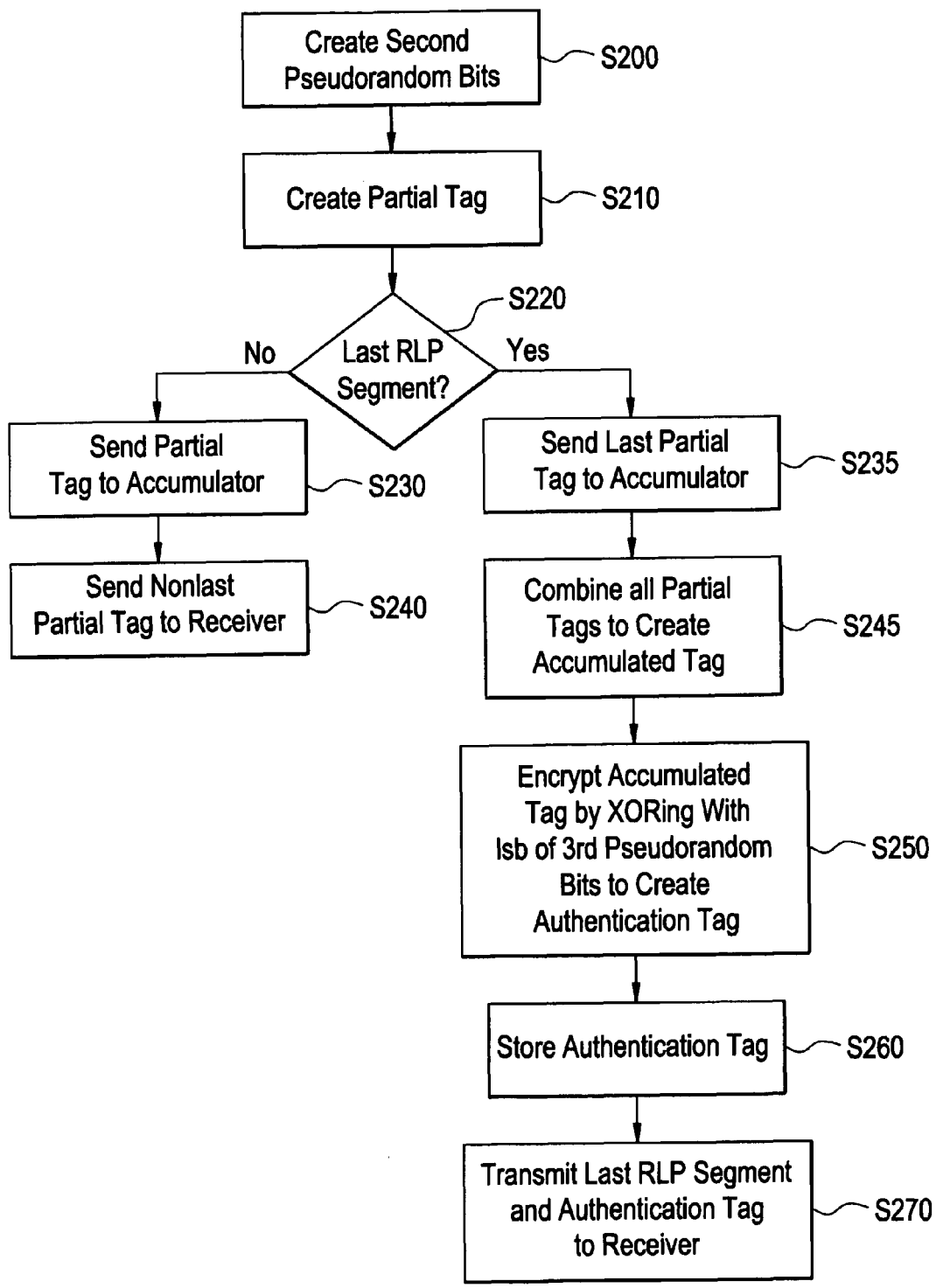

Message Integrity Tag Creation

PROCESSING METHOD FOR MESSAGE INTEGRITY WITH TOLERANCE FOR NON-SEQUENTIAL ARRIVAL OF MESSAGE DATA

PRIORITY INFORMATION

The present non-provisional application claims priority under 35 U.S.C. 119 (e)(2) to provisional application No. 60/853,646 filed on Oct. 23, 2006 and provisional application No. 60/860,330 filed on Nov. 21, 2006, the disclosures of which are incorporated herein in their entirety.

BACKGROUND OF THE INVENTION

Both encryption and message authentication/integrity are needed to provide security over a wireless air interface. Message encryption protects the privacy of a message whereas message authentication protects the message from tampering.

In a message authentication process, a sender using a secret key and a message authentication algorithm calculates a short tag, which is appended to a message. A receiver also calculates the tag for the received message based on knowledge of the secret key, and compares the calculated tag with the received tag. If the tags are the same, then the receiver accepts the message; otherwise, the message is discarded.

Existing message authentication algorithms, for example, keyed-Hash Message Authentication Code-Secure Hash Algorithm (HMAC-SHA) and Advanced Encryption Standard-Cipher Algorithm in Cipher Block Chaining (AES-CBC), do not allow out-of-order packet processing because they are serial operations and require that bits be processed in the order they were sent. Hence, the conventional approaches to message authentication must send data to a RAM, let a central processor (CP) reorder data packets and reassemble an application packet (message), and send the application packet to hardware to do message authentication. This significantly increases traffic on the bus and can significantly add latencies in the packet processing.

In addition, existing message authentication algorithms operate on blocks at a time. As a consequence, a block level algorithm cannot operate on a message segment that ends in a non-block boundary. It would be necessary to reassemble the entire application packet from all message segments before beginning to perform the message authentication tag verification.

SUMMARY OF THE INVENTION

In an example embodiment of the present invention, a method for processing an application packet for transmission, includes breaking the application packet into a plurality of segments, creating first pseudorandom bits, and generating partial tags based on each of the plurality of segments and portions of the first pseudorandom bits associated with each of the plurality of segments. The method further includes combining the partial tags including a last partial tag associated with a last segment of the application packet to create an accumulated tag, generating an authentication tag based on the accumulated tag and second pseudorandom bits, storing the authentication tag, and transmitting the plurality of segments including the authentication tag.

In another example embodiment, a method of processing received application packet segments includes receiving a plurality of segments of an application packet including an authentication tag, creating first pseudorandom bits, and generating partial tags based on each of the received plurality of segments and portions of the first pseudorandom bits associated with each of the received plurality of segments. The method further includes storing the partial tags, the received plurality of segments, and the received authentication tag in a memory, combing the received plurality of segments to create the application packet, combining the partial tags to create a calculated tag, and verifying authenticity of the application packet based on the calculated tag and the received authentication tag.

BRIEF DESCRIPTION OF THE DRAWINGS

Example embodiments of the present invention will become more fully understood from the detailed description given herein below and the accompanying drawings, which are given by way of illustration only and thus are not limiting of the example embodiments of the present invention.

FIG. 3 illustrates a flow chart of creating an integrity tag according to an example embodiment of the present invention;

DETAILED DESCRIPTION OF THE EXAMPLE EMBODIMENTS

Figure 1:
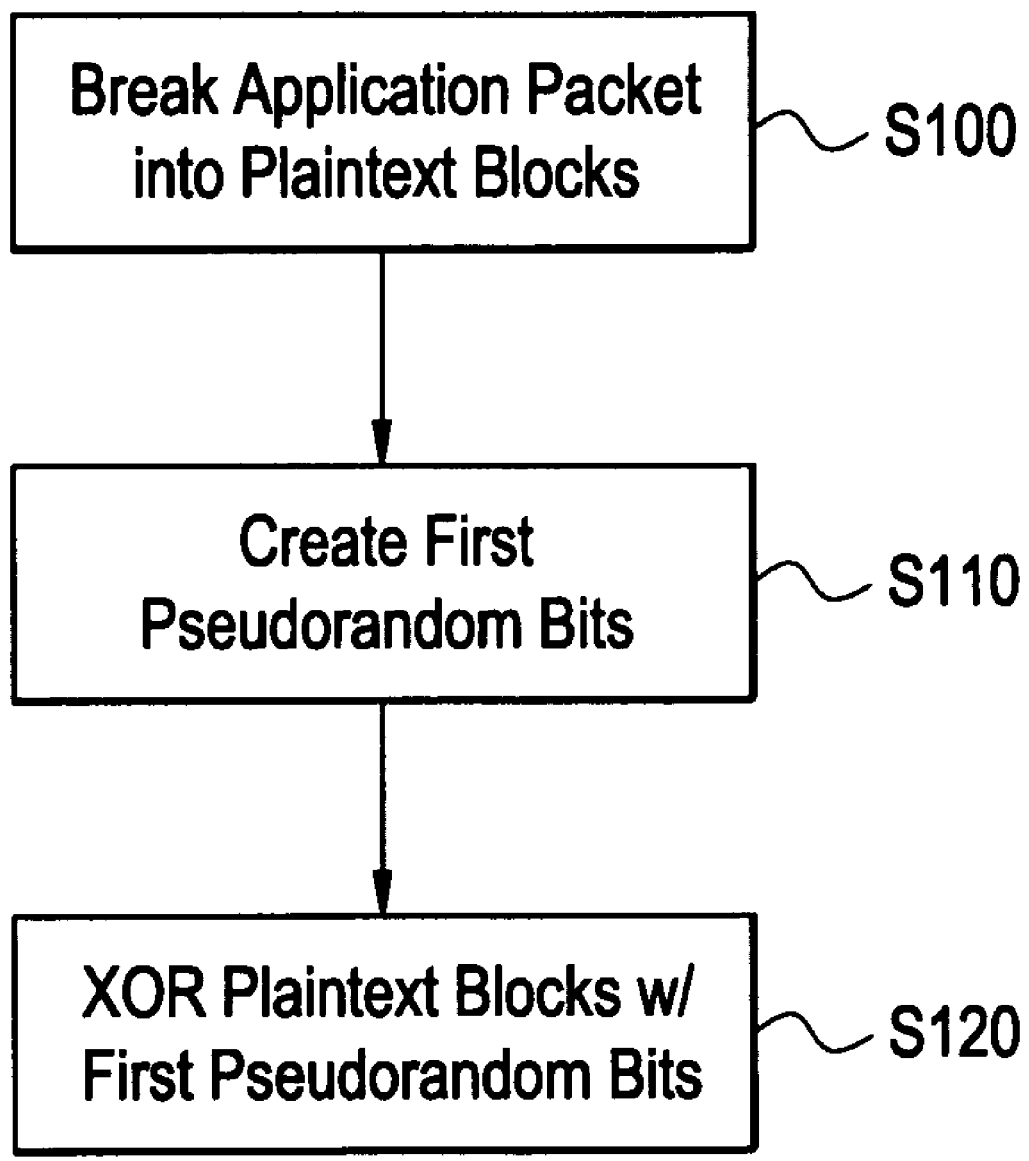
FIG. 1 is a flow chart of a logical encryption method according to an example embodiment of the present invention.

It will be understood that, although the terms first, second, third etc. may be used herein to describe various elements, components, regions and/or sections, these elements, components, regions and/or sections should not be limited by these terms. These terms may only be used to distinguish one element, component, region, or section from another region or section. Thus, a first element, component, region or section discussed below could be termed a second element, component, region or section without departing from the teachings of the present invention.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-section illustrations that may be schematic illustrations of idealized embodiments (and intermediate structures). Thus, the example embodiments should not be construed as limited to the particular location and arrangements illustrated herein but are to include deviations thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention relates to message authentication between a sender and a receiver. The sender may be any communication device in any well-known wireless communication system capable of sending packet communication. For example, the sender may be a mobile station, a base station, etc. As will be appreciated, a mobile station may be a mobile phone, PDA, portable computer, etc. The receiver may be any receiving counterpart of the sender such as a mobile station, base station, etc. Furthermore, it will be understood that the present invention may be applied to wireless and/or network communication.

To best understand message authentication, according to the embodiments of the present invention, message encryption will first be described. And, in order to understand encryption, the radio link protocol will first be described.

Radio Link Protocol

Radio link protocol (RLP) is a segmentation and reassembly protocol that operates over a wireless air interface between an access terminal (AT) (also known as a mobile station) and an access node (AN) (also known as a base station). The RLP is responsible for fragmenting (segmenting) an application packet into RLP segments or packets such that they can efficiently be sent over an RF link. Furthermore, the RLP is also responsible for reassembly of the RLP segments at the receiver, re-ordering out of sequence packets and retransmission in case a segment is lost during transmission.

Message Encryption

Encryption and/or authentication/integrity may be performed on the RLP segment. For example, the well known counter mode (CTR) encryption may be used to encrypt the RLP segments.

RLP segments, for example, a message, data, voice, etc., to be encrypted are usually referred to as plaintext, and the result of the encryption process is referred to as ciphertext. Often, the encrypting process involves performing an encryption algorithm on the plaintext to obtain the ciphertext. Many encryption algorithms such as data encryption standard (DES), advanced encryption standard (AES), etc. involve the use of a key in the encryption process. The encryption key is a bit sequence used in the encryption algorithm to generate the ciphertext. The encryption key is known at both the sending and receiving sides of the communication, and at the receiving side the encryption key is used to decrypt the ciphertext into the plaintext.

In the case of encryption in the wireless communication environment, involving encryption of frames of information sent between an AN and an AT, a problem arises if the same information (i.e., the same plaintext) is sent during two different frames. In that circumstance the same ciphertext is produced for each of the two frames. As such, information on the ciphertext is said to have leaked. To prevent replay attacks that could occur with such leaked ciphertext, an encryption technique using a cryptosync has been developed. The cryptosync, for example, includes a count value incremented after each use of the cryptosync for encryption. In this manner, the cryptosync changes over time. In a typical use of the cryptosync, the encryption algorithm is applied to the cryptosync as if the cryptosync were plaintexts. The resulting output is referred to as a mask. The mask then undergoes an exclusive-OR operation with the information (e.g., RLP segments) for encryption to generate the ciphertext. As with encryption keys, the cryptosync is known at both the sending and receiving sides, and at the receiving side the cryptosync is used to decrypt the ciphertext into the plaintext.

Application Packet Encryption

To better understand message integrity according to embodiments of the present invention, a brief description of a method of encrypting an application packet as it applies to message integrity will be given.

Figure 2:
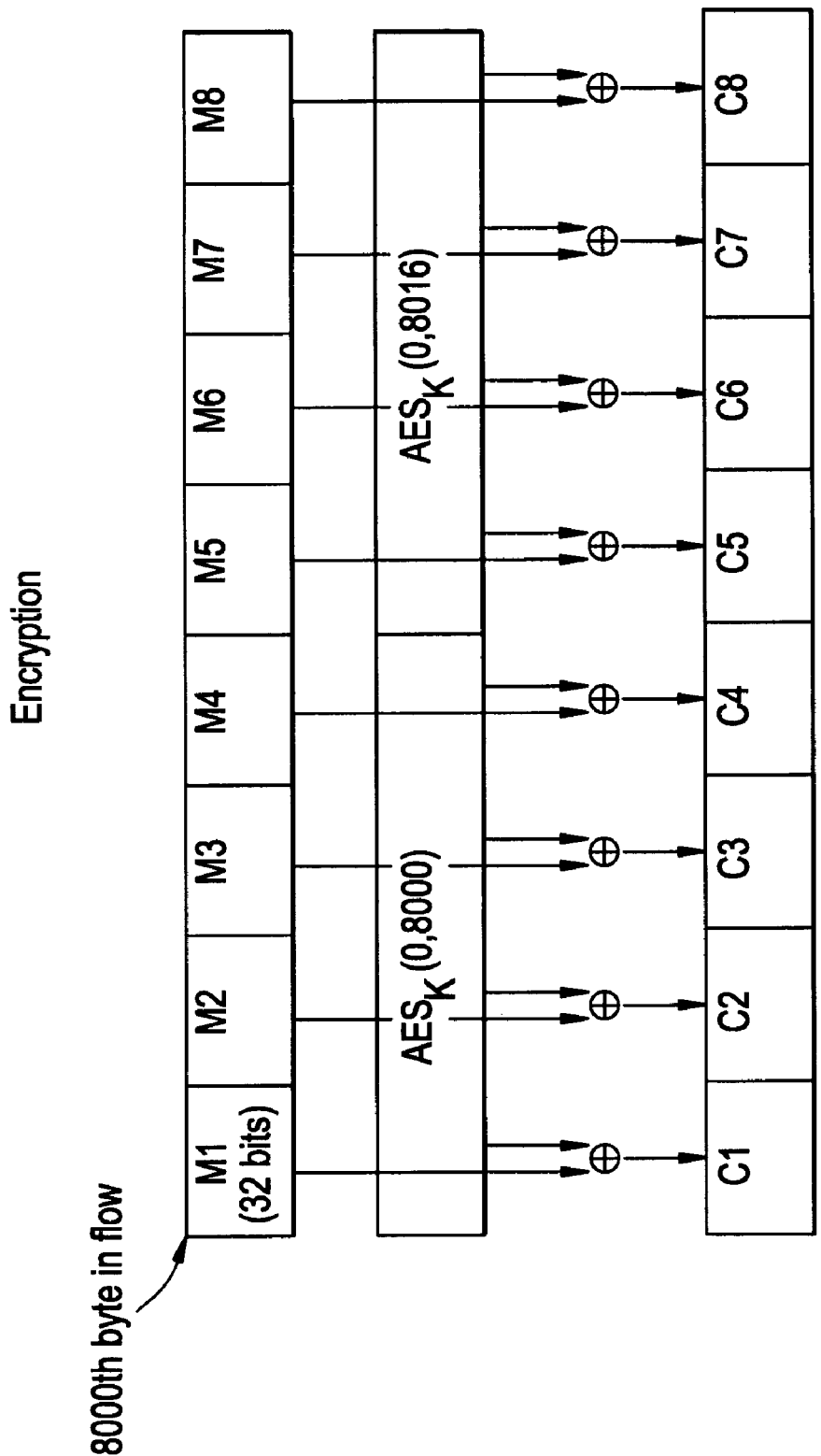
FIG. 2 illustrates a graphic example of the embodiment in FIG. 1.

FIG. 1 is flow chart of the logical encryption method according to an example embodiment of the present invention, and FIG. 2 shows a graphic example of this process.

In the example embodiment, there is an assumption that an application packet's radio link protocol (RLP) segments are sent for encryption without interleaving with another application packet's RLP segments. For illustration purposes only, it is also being assumed that a 768 byte application packet is being sent on the $8000^{th}$ byte of a RLP stream, and, the RLP segments are a multiple of 4 bytes. In other words, the RLP segment is a multiple of a block size. As it will appreciated by a person of ordinary skill, the application packet size, the RLP byte stream, and the size of the RLP segments may all be varied.

Referring to FIGS. 1 and 2, a sender logically breaks an application packet or a data packet having a length of 768 bytes into a multiple of a block size (in step S100), for example, 32 bit (4 byte) plaintext blocks $M_1$-$M_{192}$. In FIG. 2 illustrates blocks $M_1$ to $M_8$.

Using the advanced encryption standard (AES) with two (2) arguments (inputs), for example, a key k and cryptosync value based on the byte number, first pseudorandom blocks (bits) $AES_k$ (0, 8000)-$AES_k$ (0, 8016) may be created in step S10. In FIG. 2, the designation, i.e., TYPE, "0" is used to distinguish the first pseudorandom bits with other pseudorandom bits. See below.

In further detail, the first pseudorandom bits $AES_k$ (0, 8000)-$AES_k$ (0, 8016) may be written as:

First Pseudorandom Bits(OUTPUT)=AES(k, INPUT)

The cryptosync value (INPUT) to the AES may be broken into two parts, TYPE (e.g., 8 bits) and COUNTER (e.g., 64 bits), the rest of the INPUT bits may be set to zero. As it is generally known, the COUNTER value should never be repeated for a particular TYPE value in order to guarantee that the entire INPUT value is never repeated to the AES. Again, "TYPE" is used to distinguish the use of the AES to create the various pseudorandom bits. To create the first pseudorandom bits, the byte number in the RLP stream may be used as the COUNTER value, because the BYTE_NUMBER is never repeated for a particular stream. Accordingly, the key k and the cryptosync value may be used to create a 128 bit output. The size of the cryptosync value may be varied, and the cryptosync value may contain other inputs, e.g., flowID, reset counter, etc. Addition details will be provided below.

Next, in Step S120, the sender performs an exclusive-OR operation (XORed) on the plaintext blocks $M_1$ to $M_8$ with the first pseudorandom bits $AES_k (0, 8000)$-$AES_k (0, 8016)$ to create encrypted (ciphertext) blocks $C_1$-$C_8$ as shown in FIG. 2.

Although a counter mode (CTR) encryption was described to encrypt the RLP segments above, other well known encryption methods, for example, output feedback (OFB) mode, cipher feedback (CFB) mode, etc. may be used.

Message Integrity

Once an application packet, more specifically, RLP segments are encrypted, an integrity process according to an embodiment of the present invention may be performed on the RLP segments to create an authentication tag for the application packet.

Figure 4A:
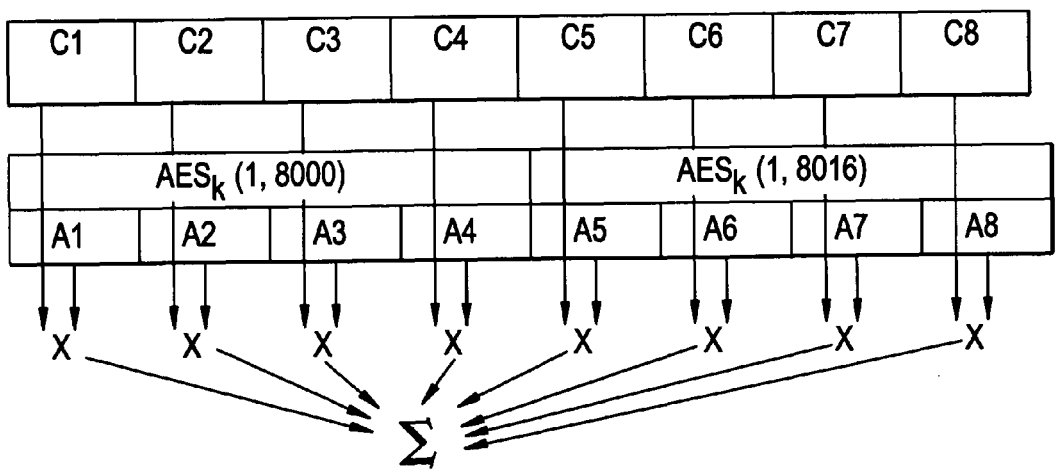
FIG. 4A illustrates a graphic example of the integrity tag creation method shown in FIG. 3.

FIG. 3 illustrates a flow chart of creating an integrity (authentication) tag according to an example embodiment of the present invention. FIG. 4A illustrates a graphic example of the process. For simplicity, the terms ciphertext blocks and RLP segments will be interchangeably used throughout the disclosure.

With reference to FIG. 3, in step S200 the sender creates second pseudorandom bits Ai. In detail, again using the advanced encryption standard (AES) with two (2) arguments (inputs), for example, a key k and cryptosync value based on the byte number, second pseudorandom bits $AES_k (0, 8000)$-$AES_k (0, 8016)$ may be created. In FIG. 4A, the designation, i.e., TYPE, "1" is used to distinguish the second pseudorandom bits with other pseudorandom bits, for example, the first pseudorandom bits.

In further detail, the second pseudorandom bits $AES_k (0, 8000)$-$AES_k (0, 8016)$ may be written as:

Second Pseudorandom bit(OUTPUT)=AES($k$, INPUT)

The cryptosync value (INPUT) to the AES may be broken into two parts, TYPE (e.g., 8 bits) and COUNTER (e.g., 64 bits), the rest of the INPUT bits may be set to zero. As it is generally known, the COUNTER value should never be repeated for a particular TYPE value in order to guarantee that the entire INPUT value is never repeated to the AES. Again, "TYPE" is used to distinguish the use of the AES to create the various pseudorandom bits. To create the second pseudorandom bits, the byte number in the RLP stream may be used as the COUNTER value, because the BYTE_NUMBER is never repeated for a particular stream.

For example,

OUTPUT[0]=AES(k, TYPE, 0) is 128 bits or 16 bytes long.

Next,

OUTPUT[16]=AES(k, TYPE, 16) is also 128 bits long, OUTPUT [32]=AES(k, TYPE, 32) is also 128 bits long, etc.

The OUTPUT is labeled 32 bits long at a time. Accordingly,

A0=first 4 bytes of OUTPUT[0]
A1=second 4 bytes of OUTPUT[0]
A2=third 4 bytes of OUTPUT[0]
A3=last 4 bytes of OUTPUT[0]
A4=first 4 bytes of OUTPUT[16]
A5=second 4 bytes of OUTPUT[16]
A6=third 4 bytes of OUTPUT[16]
A7=last 4 bytes of OUTPUT[16]
A8=first 4 bytes of OUTPUT[32]
A9=second 4 bytes of OUTPUT[32]
A10=third 4 bytes of OUTPUT[32]
A11=last 4 bytes of OUTPUT[32]

To generalize:

$Ai=[i/4^{th}$ 32 bit part of OUTPUT][BYTE_NUMBER/16]

Accordingly, the key k and the cryptosync value may be used to create a 128 bit output. The size of the cryptosync value may be varied, and the cryptosync value may contain other inputs, e.g., flowID, reset counter, etc.

Next with reference to FIG. 3, each ciphertext block (RLP segment) created in step S120 of FIG. 1 is multiplied with a respective one of the second pseudorandom bits Ai to create a partial tag in step S210.

Then in step S220, the sender determines whether the RLP segment is the last RLP segment. A flag in a header of the RLP segment may be set to indicate beginning segment, middle segment, or last segment. If the RLP segment is not the last RLP segment, the partial tag, e.g., a 32 bit partial tag, is sent to an accumulator (not shown) in the sender at step S230. The sender sends the RLP segments to a receiver at step S240.

Figure 4B:
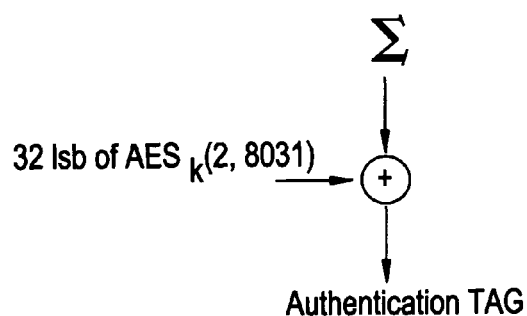
FIG. 4B illustrates an accumulation operation according to the method of FIG. 3.

If the RLP segment is the last RLP segment, then the last partial tag is sent to the accumulator at step S235. The process of sending the last partial tag to the accumulator is the same as the process of sending the non-last partial tags to the accumulator. As illustrated in FIG. 4B, after the last partial tag is sent to the accumulator, an accumulated tag is formed by adding the partial tags to create a 32 bit accumulated tag in step S245. As will be understood, the partial tags may instead be added to a partially accumulated tag after each partial tag is generated. Then, in step S250, the sender encrypts the accumulated tag by XORing the accumulated tag with least significant bits (lsb) of third pseudorandom bits $AES_k (2, LastByteNumber)$ to create an authentication tag. Because formation of the third pseudorandom bits is readily apparent from the above description, for brevity, a description of creating the third the pseudorandom bits is omitted.

In step S260, the authentication tag is also sent to a memory in case of RLP segment retransmission. The authentication tag is appended to the last RLP segment and transmitted to a receiver for decoding at step S270. The memory may be a RAM or any other storage device controlled by a central processor (CP), or the memory device may be part of or controlled by an application specific integrated circuit (ASIC). Only for the last RLP packet of the application packet is the authentication tag stored.

It will be appreciated that numerous modifications to the embodiment of FIG. 4 are possible without departing from the overall teachings provided thereby. For example, steps S210 and S220 may be performed in reverse order, or may be performed in parallel. As another example, steps S260 and S270 may be performed in parallel and/or series.

Retransmission

As is generally known, a receiver may not receive all the transmitted RLP segments from the sender or transmitter. There are many reasons why the receiver may not receive all the sent RLP segments. For brevity, the details why RLP segments are lost will be omitted. If the receiver does not receive all the RLP segments, then the non-received RLP segment may be retransmitted by the sender.

When the central processor in the sender sends an RLP segment to hardware for transmission and retranmission, the central processor also sends a bit to indicate whether the RLP segment is a retransmission. The process of requesting retransmission is well known in the art, accordingly an explanation thereof will also be omitted for brevity.

Figure 5:
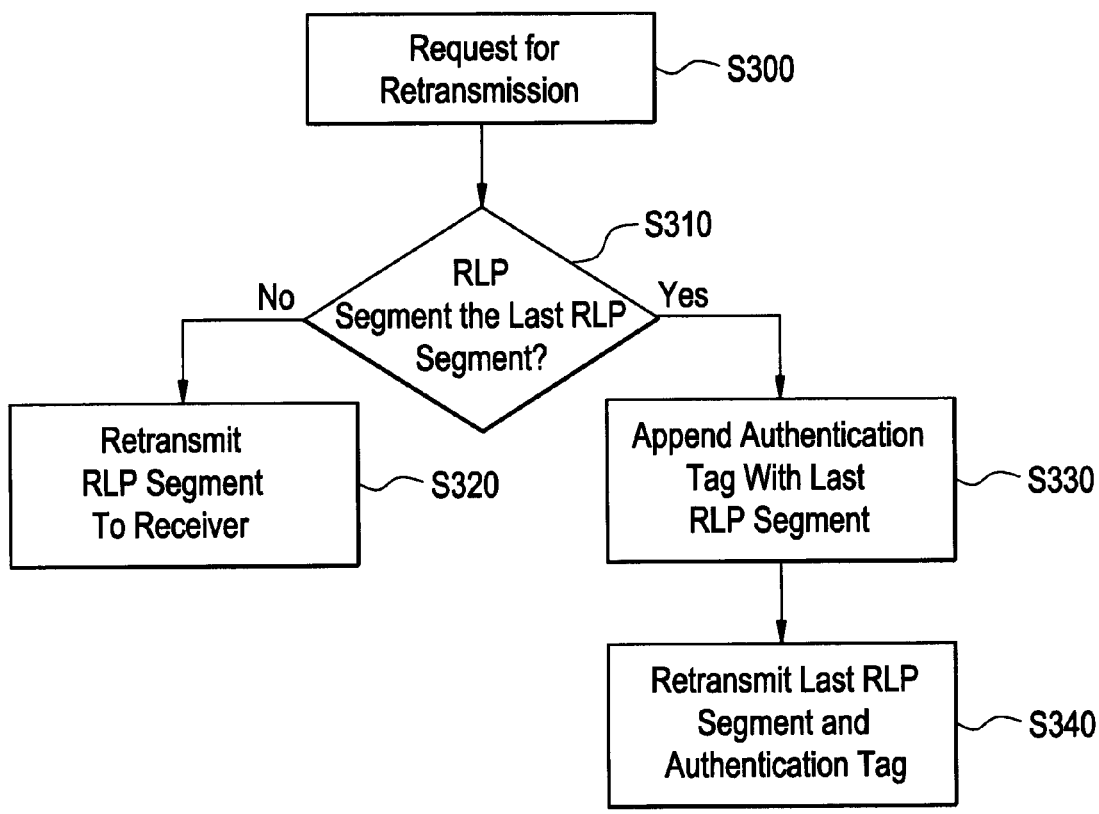
FIG. 5 illustrates a flow chart for a retransmission of an RLP segment according to an example embodiment of the present invention.

With reference to FIG. 5, the sender or transmitter receives a request for retransmission of an RLP segment in step S300. In step S310, the sender determines if the retransmission request is for the last RLP segment of the application packet or for a non-last RLP segment. If the request is for a non-last RLP segment, then in step S320 the RLP segment is encrypted and retransmitted.

If in step S310 the request is for the last RLP segment of the application packet, then at step S330 the accumulated authentication tag, which was stored in the CP/RAM, is encrypted and appended to the last RLP segment. The encrypted last RLP segment along with the encrypted authentication tag is retransmitted to the receiver at step S340.

As an option, between steps S310 and S330, the last RLP segment may be further refragmented. For example, a transmitter may determine based on transmitting conditions that the entire last RLP segment should be further broken into smaller fragments to reduce the load. Each of the smaller segments is sent on a different time slot. Here, only the last of the smaller fragments is appended with the encrypted authentication tag prior to retransmission.

Decryption and Inline Integrity Check

If the receiver properly receives all the RLP segments including the authentication tag, the receiver must decrypt the RLP segments, if they were encrypted, and perform an integrity check.

Figure 6:
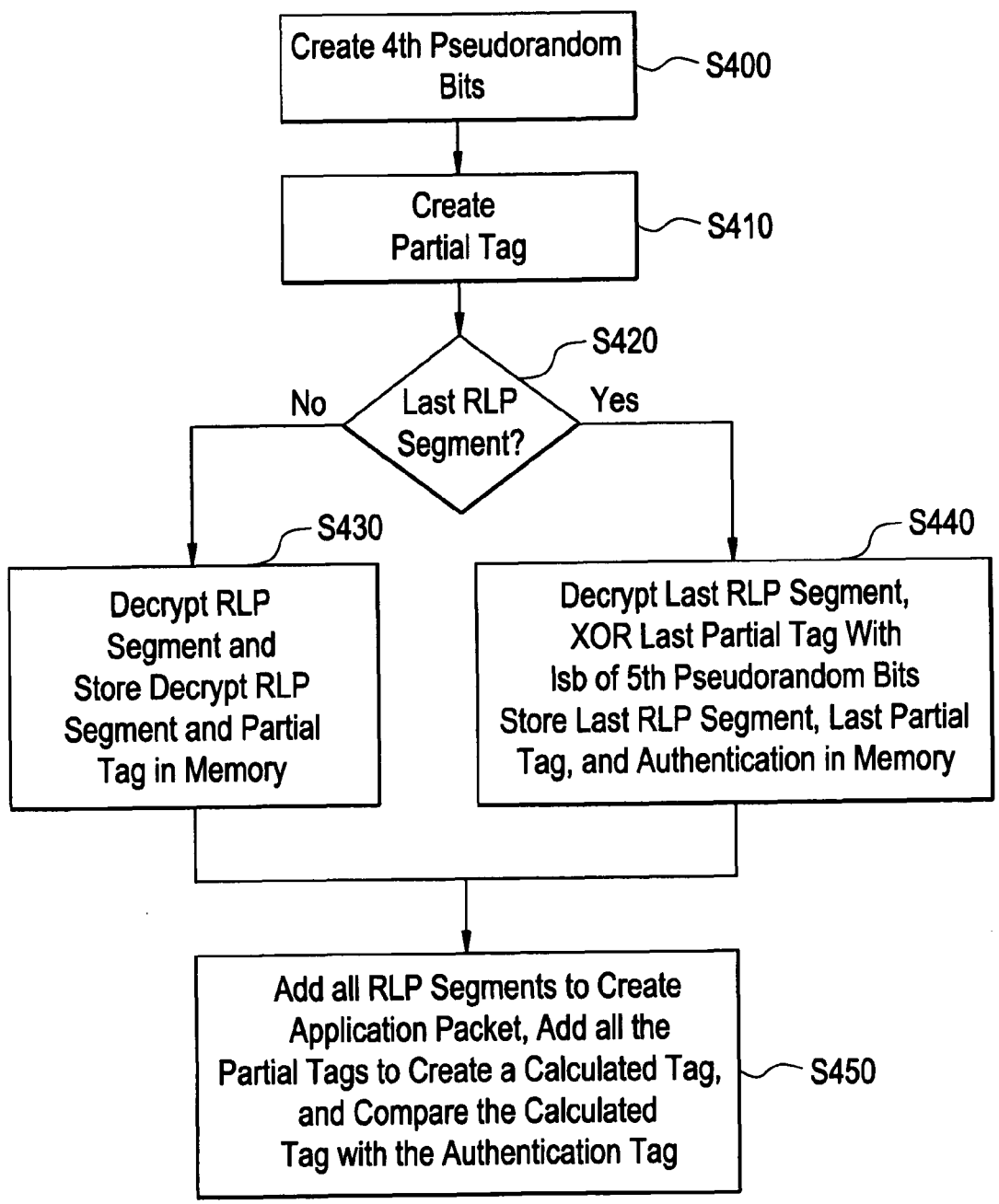
FIG. 6 illustrates a flow chart of decryption and inline integrity check according to an example embodiment of the present invention.

FIG. 6 illustrates a flow chart illustrating a method of decryption and inline integrity check according to an example embodiment of the present invention. Here, "inline" means that the integrity calculation is made as the RLP segments are received by the receiver as opposed to waiting to receive the entire RLP segments.

After all RLP segments are received at the receiver, fourth pseudorandom bits are created at step S400. As with step S200 of FIG. 4, an AES may be used to create the fourth pseudorandom bits. Because formation of the fourth pseudorandom bits is readily apparent from the above description, for brevity, a description of creating the fourth the pseudorandom bits is omitted.

In step S410, partial tags are created for the received RLP segments. The partial tags may be 32 bit partial tags. Then in step S420, the receiver determines whether the RLP segment is the last RLP segment. If the RLP segment is not the last RLP segment, the RLP segment is decrypted, and together with the partial tag, sent to a memory in the receiver at step S430. Similar to the transmitter, the receiver's memory may be a RAM or any other storage device controlled by a central processor (CP), or the memory device may be part of or controlled by an application specific integrated circuit (ASIC). Also similar to steps described above with respect to FIGS. 3 and 4, the partial tag creation step and the step of determining whether the RLP segment is the last RLP segment may be reversed. Decryption methods are well known in the art, therefore, a description thereof will be omitted for brevity.

If the receiver determines that the RLP segment is the last RLP segment at step S420, the last RLP packet is decrypted in step S440. Also, the last RLP segment's partial tag is XORed with lsb of fifth pseudorandom bits $AES_k$(2, LastByteNumber), and along with the authentication tag from step S270 sent to the memory at step S440. An explanation of the creation of the fifth pseudorandom bits will be omitted for brevity. In addition, it will be obvious to a person of ordinary skill that the method of creating the fourth and fifth pseudorandom bits are the same as the method of creating the second and third pseudorandom bits, respectively, as described above.

A central processor (CP) assembles all the RLP segments to form the application packet. The CP also adds all the partial tags received in steps S430 and S440. If the summation of the calculated partial tags equals the received authentication tag, then the application packet is verified at step S450.

Non-Multiple of a Block Size

In the above described example embodiments, integrity, encryption, and decryption methods were described with respect to RLP segments that are a multiple of a block size, for example, 32 bits (4 bytes). In other words, the RLP segments were of a standard block size of 32 bits. In the following example embodiment, RLP packets that are not of a standard block size, for example, not a multiple of 32 bits will be described. Only those aspects (steps) that are different between the standard RLP segment block size and the non-standard RLP segment block size will be described for brevity.

Assuming RLP segments of an application packet are not of a multiple of a block size, for example, not a multiple of 32 bits, and given a bit sequence number, it is possible to identify a beginning byte that is a multiple of 32 bits. Once the beginning byte that is a multiple of 32 bits is identified, a universal hash may be performed on the 32 bit value.

As will be appreciated, the bits prior to the "multiple of 32 bits" and the ending bits must be properly managed. RLP segments that are not a multiple of 32 bits, may be pre-pended with zeroes in the beginning of the RLP segment and/or zeroes may also be appended to the end of the RLP segment to complete a 32 bit ciphertext block Ci. For example, a 32 bit ciphertext may be written as a polynomial t $$C_{i,a} \times t^{24} + C_{i,b} \times t^{16} + C_{i,c} \times t^8 + C_{i,d} \times t^0$$

So $A_i \times C_i$ may be rewritten as $$A_i \times C_{i,a} \times t^{24} + A_i \times C_{i,b} \times t^{16} + A_i \times C_{i,c} \times t^8 + A_i \times C_{i,d} \times t^0$$

Addition and multiplication may be calculated based on the Galois Field ($2^{32}$), or other fields may be used for the modification, e.g., working over a modulator prime larger than 32 bits. A full 32 bit Ai may be associated with that block Ci.

Figure 7:
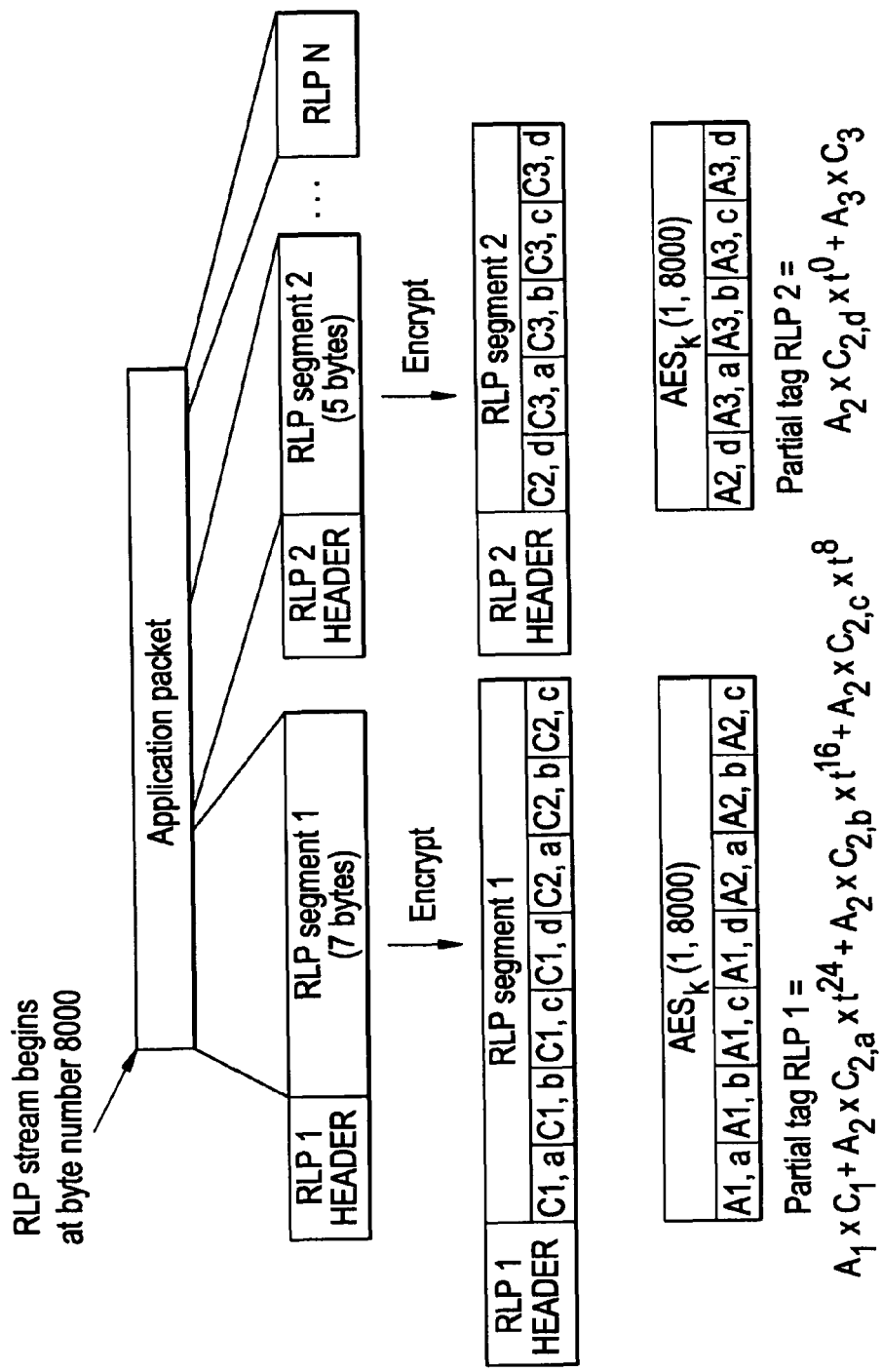
FIG. 7 illustrates partial tag calculation for non-multiple of a block size segments according to an example embodiments of the present invention.

In detail and with reference to FIG. 7, assume that a first RLP segment (RLP 1) is 7 byte long, which means that RLP segment 1 ends with 3 extra bytes. The next segment, RLP segment 2 has the remainder bytes (3 bytes) before the 4 byte multiple begins. The 32 bit $C_i$ is composed of 32 bits $C_{i,a}$, $C_{i,b}$, $C_{i,c}$ and $C_{i,d}$. Accordingly, 3 bytes of $C_2$ is part of RLP segment 1 and the last byte is part of RLP segment 2. In addition, 32 bit A2 is created and used by both RLP segment 1 and RLP segment 2 to create a partial 32 bit tag. Thus, the 32 bit partial tag for RLP segment 1 adds:

$$A_i \times C_{i,a} \times t^{24} + A_i \times C_{i,b} \times t^{16} + A_i \times C_{i,c} \times t^8$$

and the 32 bit partial tag for RLP segment 2 adds:

$$A_i \times C_{i,d} \times t^0.$$

The rest of the encryption and partial tag creation processes are similar to the processes described with respect to FIGS. 1-4 above. In addition, the methods of authentication tag creation, decryption of the RLP packets, retransmission of RLP packets, and verification as disclosed above are the same. See FIGS. 5-6 and the description thereof.

Variable Length Application Packet

An application packet may also have various byte lengths. Accordingly, a description of how example embodiments of the present invention may apply to these application packets will now be given. Only those aspects that are different from the example embodiments described above will be described for brevity.

Application packets may have variable byte lengths. In the conventional art, application packets with variable byte length may be dealt with by including length (number of blocks) parameters as part of a universal hash calculation or as an input to a tag encryption. For example, padding may be used to fill a last partially filled block. However, this method cannot be used in example embodiments because the length is not known when RLP segments are received out of order.

Byte numbers of a beginning byte and a last byte may be used to substitute for the byte length value. A C0 value may be set to the number of the beginning byte, which may contribute to the term: C0×A0. For example, A0 may be a pseudorandom, precalculated, and fixed value, or A0 may be, for example, the 32 bit value preceding A1 in a pseudorandom stream Ai, and C0 is the beginning bit preceding the application packet.

Assuming A0 is the 32 bit value preceding A1 in a pseudorandom stream Ai for any C0 (beginning byte number), which is not at a multiple of 32 bit boundary, A0 is set to the 32 bit pseudorandom block that precedes the block that contains the beginning byte number. Additional steps are also required for the very beginning of an RLP flow, for example, bytes 0, 1, 2 and 3, because there is no preceding block. Illustratively, A0 may be set to be the last byte of a sixth pseudorandom bits $AES_k (3,0)$ or set as $A0=AES_k(1,2^{64}-1)$, which is the value that precedes 0 mod $2^{64}$. It is noted that it is practically impossible for the RLP stream to reach $2^{64}$ 32 bit blocks. Therefore, it is assumed that the entire byte number input to AES is 64 bits. Therefore, to create a partial 32 bit tag, C0 is the beginning byte number (32 bits); and A0 is the 32 bit mask preceding A1 in the pseudorandom stream Ai, for example, $A0=$last 32 bits of the preceding $AES_k (1, ...)$ output bits. A0 for C0 for the very beginning 4 bytes of an RLP flow is specifically created as described above.

When creating an encrypted tag (authentication tag) using seventh pseudorandom bits $AES_k$ (2, LastByteNumber), application packets ending at a different byte number will have different encryption tags. Again, the method of creating the seventh pseudorandom bits may be the same as the method of creating the third and fifth pseudorandom bits described above. To encrypt the tag, the 128 bit block number is not used, but the exact last byte number as the AES input may be used. Two different messages may create the same tag, for example, a multiple of 32 bit length message M and the message M followed by a byte of 0. However, each message will be encrypted differently, because a random string will be added for each message.

Figure 8:
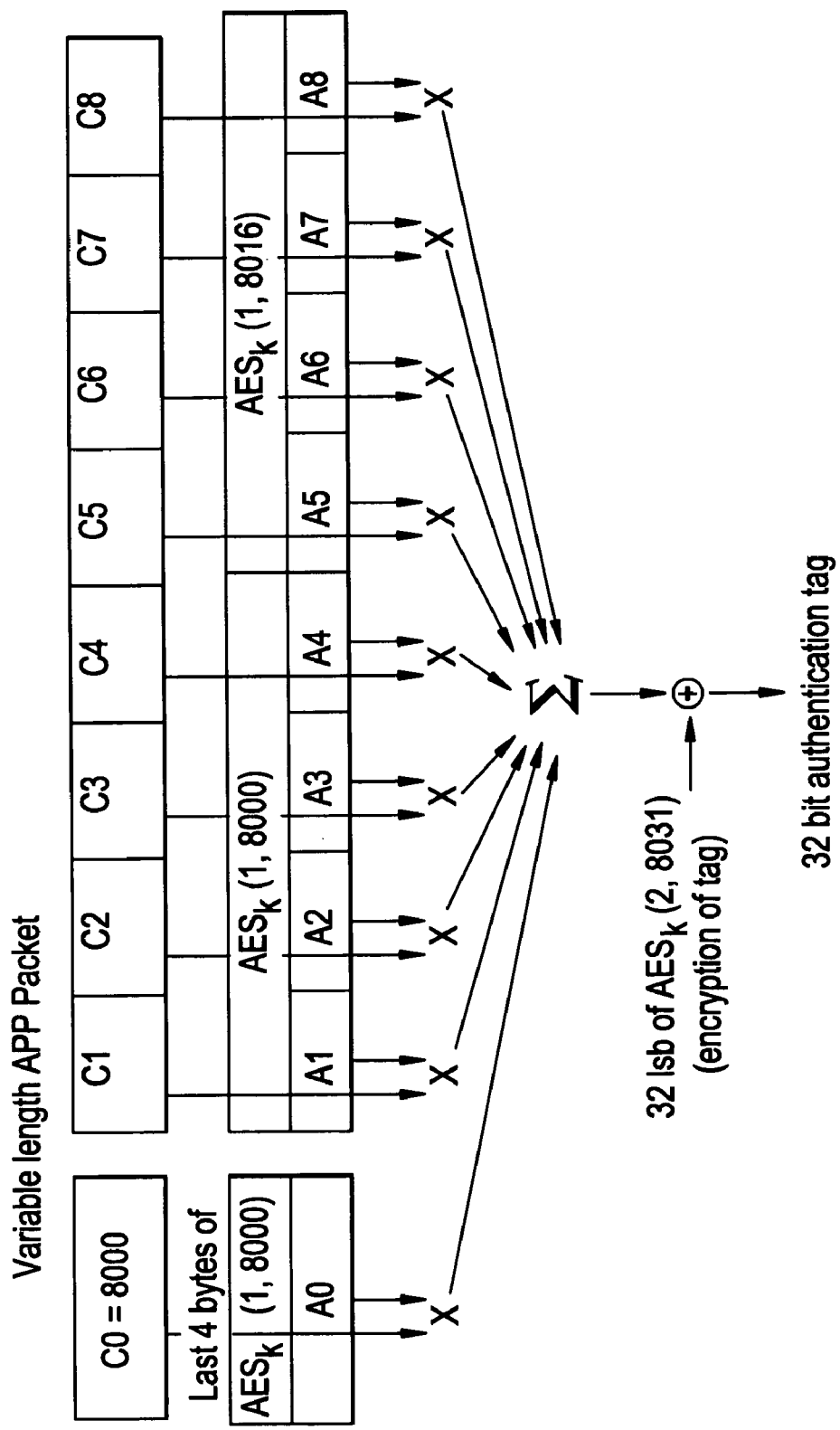
FIG. 8 illustrates partial tag calculation for a variable length application packet accordingly to an example embodiment of the present invention.

For RLP segments that begin and end at non-multiples of 32 bits, but that belong in the same application packet, Ai may be reused at the beginning bytes of an RLP segment and also at the beginning bytes of the next RLP segment. With reference to FIG. 8, an application packet that ends at a non-multiple of 32 bits and the next application packet starting at a non-multiple of 32 bits will be described.

RLP packets may be padded with zeroes to complete the 4 byte Ci. Here the Ai may be reused for both application packets. In other words, the Ai will be used at the end of the first application packet and again used at the beginning of the second application packet.

The beginning bytes of the second application packet will continue to use the 4 byte Ai based on the current i, where i equals to (LastByteNumber/4). For ending bytes of the first application packet, for example, 4X+1, 4X+2 or 4X+3 byte, the 32 bit Ai associated with the last bytes, i.e., i equal to (LastByteNumber/4) is used.

Example embodiments of the present invention allow message authentication tag verification "on the fly" as data is being received, without having to wait to reassemble the entire application packet. The example embodiments allow for byte level encryption and authentication processing, and out of order processing.

Example embodiments of the present invention being thus described, it will be obvious that the same may be varied in many ways. Such variations are not to be regarded as a departure from the invention, and all such modifications are intended to be included within the scope of the invention.

What is claimed is:

1. A method for processing an application packet for transmission, comprising:
   breaking an application packet into a plurality of segments, the plurality of segments including at least one constituent segment and a last segment;
   creating first pseudorandom bits;
   generating partial tags based on each of the plurality of segments and portions of the first pseudorandom bits associated with each of the plurality of segments;
   transmitting the at least one constituent segment from the plurality of segments;
   combining the partial tags including a last partial tag associated with the last segment from the plurality of segments of the application packet to create an accumulated tag;
   generating an authentication tag based on the accumulated tag and second pseudorandom bits;
   storing the authentication tag; and
   transmitting the last segment including the authentication tag.

2. The method of claim 1, wherein generating the authentication tag comprises:
   performing an exclusive-OR operation on the accumulated tag and the second pseudorandom bits.

3. The method of claim 2, wherein the second pseudorandom bits are a least significant bits (lsb) of the second pseudorandom bits.

4. The method of claim 1, further comprising:
   encrypting the plurality of segments by performing an exclusive-OR operation on the plurality of segments with respective portions of third pseudorandom bits to create ciperhertext blocks.

5. The method of claim 4, wherein the first, second, and third pseudorandom bits are created using an advanced encryption standard (AES) with a key k and a cryptosync value.

6. The method of claim 5, wherein the cryptosync value for the third pseudorandom bits includes a byte number of the third pseudorandom bits.

7. The method of claim 5, wherein the cryptosync value includes a byte number of each of the plurality of segments of the application packet.

8. The method of claim 5, further comprising:
   creating the second pseudorandom bits based on the last byte number of the application packet.

9. The method of claim 5, wherein the generation of the partial tags comprises:
   multiplying a beginning byte number of the application packet with fourth pseudorandom bits, the fourth pseudorandom bits created using AES with a key k and a cryptosync value, and the cryptosync value being a byte number preceding the application packet.

10. The method of claim 1, wherein the plurality of segments of the application packet are radio link protocol (RLP) segments.

11. The method of claim 1, further comprising:
    receiving a request for retransmission of the last segment of the plurality of segments;
    appending the stored authentication tag to the last segment of the plurality of segments; and
    retransmitting the last segment and the authentication tag.

12. The method of claim 11, further comprising:
    refragmenting the last segment into a plurality of fragments; and wherein the retransmitting transmits the plurality of fragments and the authentication tag.

13. The method of claim 1, wherein each of the plurality of segments is a multiple of a block size.

14. The method of claim 1, wherein if the plurality of segments is not a multiple of a block size, the method further comprising:
identifying a segment that is the multiple of a block size; and
performing at least one of pre-pending a beginning of the multiple of the block size segment with zeros, and appending an end of the multiple of the block size segment with zeros.

15. A method of processing received application packet segments, comprising:
receiving a plurality of segments of an application packet including an authentication tag,
creating first pseudorandom bits;
generating partial tags based on each of the received plurality of segments and portions of the first pseudorandom bits associated with each of the received plurality of segments;
storing the partial tags, the received plurality of segments, and the received authentication tag in a memory;
combining the received plurality of segments to create the application packet;
combining the partial tags to create a calculated tag; and
verifying authenticity of the application packet based on the calculated tag and the received authentication tag.

16. The method of claim 15, wherein the first pseudorandom bits are created using an advanced encryption standard (AES) with a key k and a cryptosync value.

17. The method of claim 15, further comprising:
creating a last partial tag for a received last segment of the plurality of segments; and
performing an exclusive-OR operation on the last partial tag with a least significant bits (lsb) of a second pseudorandom bits.

18. The method of claim 17, wherein the second pseudorandom bits are created using an advanced encryption standard (AES) with a key k and a cryptosync value.

19. The method of claim 18, wherein the cryptosync value includes a byte number of each the plurality of segments of the received application packet.

20. The method of claim 15, further comprising:
receiving a retransmission of a last segment of the plurality of segments;
creating a last partial tag for the received last segment of the plurality of segments; and
performing an exclusive-OR operation on the last partial tag with a least significant bits (lsb) of a second pseudorandom bits.

21. The method of claim 19, wherein the second pseudorandom bits are created based on the last byte number of the received application packet.

22. The method of claim 15, wherein each of the plurality of segments is a multiple of a block.

23. The method of claim 1, wherein the at least one constituent segment includes a beginning segment and at least one intermediate segment.

* * * * *